March 25, 1958  U. A. MOORES  2,827,993
VARIABLE HYDRAULIC CLUTCH
Filed July 26, 1954  2 Sheets-Sheet 1
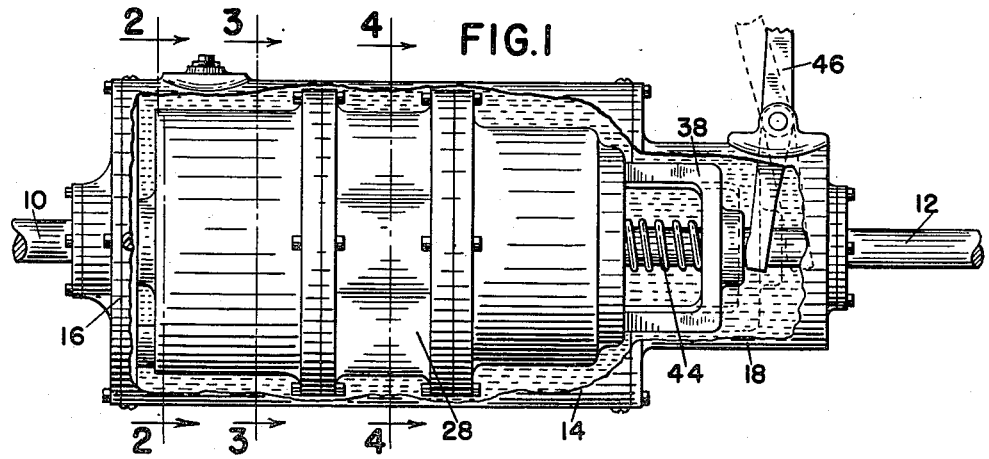
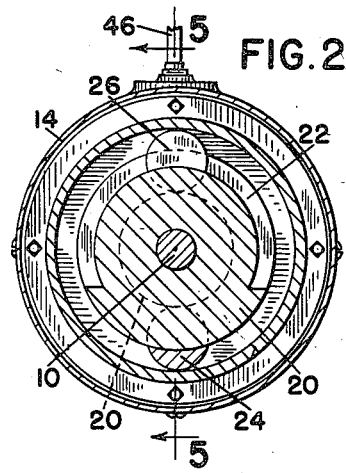
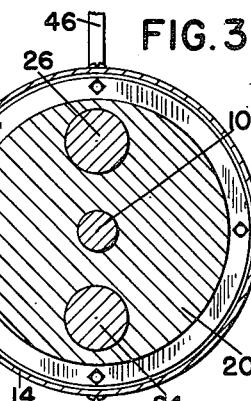
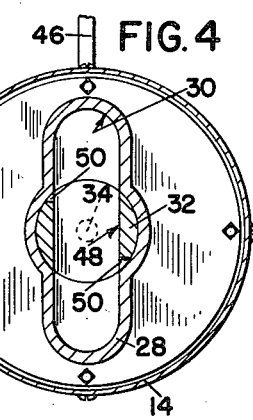
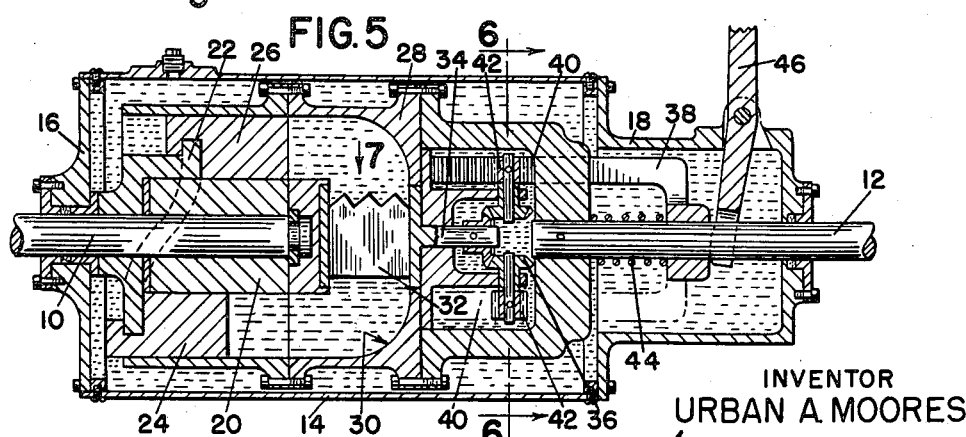
INVENTOR
URBAN A. MOORES
ATTORNEY March 25, 1958 U. A. MOORES 2,827,993
VARIABLE HYDRAULIC CLUTCH
Filed July 26, 1954 2 Sheets-Sheet 2
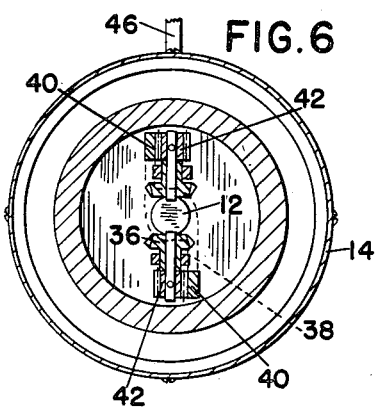
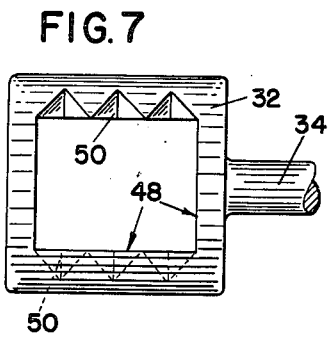
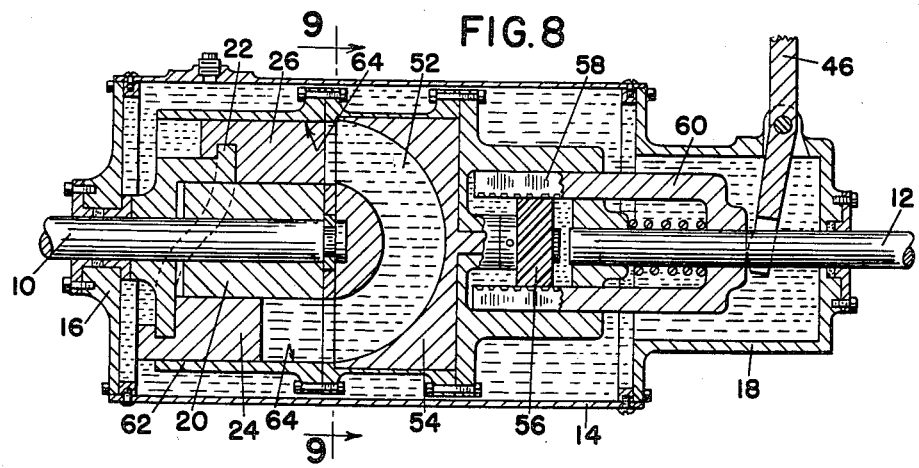
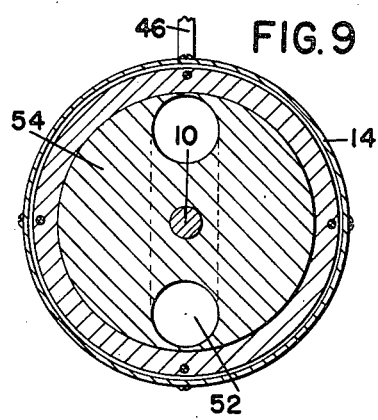
INVENTOR
URBAN A. MOORES
ATTORNEY United States Patent Office 2,827,993
Patented Mar. 25, 1958

2,827,993
VARIABLE HYDRAULIC CLUTCH
Urban A. Moores, Rutland Heights, Mass.
Application July 26, 1954, Serial No. 445,719
3 Claims. (Cl. 192—59)

This invention relates to a variable torque, variable speed, hydraulic clutch, and the principal object of the invention resides in the provision of a smooth-acting clutch in which the power losses are reduced to a minimum and the device occupies the smallest possible space; the output is accurately proportional to the input, and this clutch being extremely easy to operate, providing for infinitesimal changes from full speed to stop of the driven part; the provision of a hydraulic clutch as described involving a simplified mechanism comprising a pair of pistons which are reciprocable in unison by the drive shaft and which are connected by a passage filled with fluid, so that when the passage is unrestricted, the drive shaft will rotate and merely reciprocate the pistons, causing the fluid to be displaced back and forth in the passage without accomplishing any work or rotation of the driven shaft, in combination with a new and improved valve means for variably restricting said passage and thus resisting the reciprocation of the pistons, so that in effect a clutching action is accomplished between the drive shaft and the pistons, the latter being contained in a housing including the valve and the fluid passage and being connected to a driven shaft for rotation of the latter according to the degree of closing off or restriction of the fluid passage by means of the valve, and including easily-operable manual means for opening and closing the valve, so that any speed or torque ratios between zero and full speed and torque, are attained.

Other objects and advantages of the invention will appear hereinafter.

Reference is to be had to the accompanying drawings, in which

Fig. 1 is a view in elevation, with part cut away, illustrating the invention;

Figs. 2, 3 and 4 are sectional views on the respective lines 2—2, 3—3 and 4—4 in Fig. 1;

Fig. 5 is a sectional view on the line 5—5 of Fig. 2;

Fig. 6 is a sectional view on line 6—6 of Fig. 5;

Fig. 7 is an enlarged plan view of the valve, looking in the direction of arrow 7 in Fig. 5;

Fig. 8 is a vertical longitudinal section illustrating a modification; and

Fig. 9 is a section on line 9—9 of Fig. 8.

In carrying out the present invention, there is provided a drive shaft 10 and a driven shaft 12, both of which extend into an enclosure or housing 14 which may be of the general construction and appearance shown in the drawings. The drive shaft 10 is properly journalled and the end plates 16 and 18 of the housing 14 are properly provided with gaskets for the prevention of the escape of fluids within the housing 14, as perhaps best indicated in Fig. 5.

The drive shaft 10 is provided at its inner end with a cam block 20 upon which is mounted a spiral cam or the like 22. The cam 22 is circular in outline and is adapted to engage a pair of pistons 24 and 26, the latter being provided with appropriate cross slots to receive the cam. Thus as the shaft 10 rotates, the cams 24 and 26 are forced to reciprocate and in the illustration they reciprocate parallel to the shaft 10. This relationship of parts is not essential to the invention, but forms a construction using a minimum of space.

A rotary member generally indicated at 28 is provided with a U-shaped cylindrical passage as at 30, the legs of the "U" forming cylinders for the reciprocatory reception of the pistons 24 and 26. These legs are connected by a passageway which is filled with fluid. As the pistons reciprocate, this fluid is merely pushed back and forth within the passage.

A valve generally indicated at 32 is interposed in the fluid passage and is adapted to leave it fully open or to completely close it off and to provide for any condition of partial closing between the two extremes. In Fig. 5, this valve is shown as rotatable and it is mounted on a rotary shaft 34 having a gearing generally indicated at 36, by which it may be rotated on an axis parallel to shaft 10.

The means for rotating the valve 32 comprises a saddle or bracket 38 which may be U-shaped as shown, the legs of the "U" being provided with racks 40 which are engaged with pinions 42. The gearing 36 being in fixed position relative to the bracket 38, rectilinear movement of the bracket 38 will cause the gearing to rotate and thus rotate the valve 32.

The bracket 38 is moved rectilinearly in one direction by means of a spring 44 and in the opposite direction by means of a hand-operated lever 46 which extends into the housing and may be operated from a position exterior thereof, the inner end of the lever being in the form of a fork straddling the output or driven shaft 12 and clearly being positioned for moving bracket 38 to the left in Figs. 1 and 5, this bracket being movable to the right upon retraction of the lever, by means of the spring.

The valve itself is preferably cylindrical in form (see Figs. 4 and 7). This cylinder is diametrically pierced, forming a relatively large aperture 48, so that when the valve is positioned as shown in Fig. 5, the fluid passageway in the member 28 is fully open and the driven shaft is not rotated. However, the valve 32 upon being turned at right angles to the position shown in Figs. 4 and 5 will completely block off the fluid passage and since the fluid therein may no longer be moved back and forth, it necessarily follows that the member 28 must rotate with the shaft 10 and at the same speed.

Obviously any degree of opening or closing of valve 32 between the two extremes is possible merely by the correct position of lever 46 and therefore any degree of torque and speed desired may be applied to the output or driven shaft 12. Opposite edges of the valve 32 as indicated at 50 may be serrated, thus providing for a smooth transition from open to closed condition, preventing any shock due to hydraulic pressure at the instant closure of the valve takes place. This also provides for smoother opening of the valve from totally closed position.

The modified form of the device shown in Figs. 8 and 9 includes the same type of drive shaft 10, block 20, cam 22 and pistons 24 and 26, but in this case the U-shaped fluid passage which is indicated at 52 is not provided with a separate valve but instead is formed by the member 54 which itself is rotatable as by a worm gear 56 and corresponding gear 58 on a bracket 60 otherwise similar to that at 38 and operative as by the same lever 46.

In this case, the member 54 which forms the closed end of the U-shaped passage, being itself turnable with respect to the fixed portions thereof at 62, itself acts as a valve and gradually closes off the cylinders 64 as seen in Fig. 9. Otherwise the construction and operation of the device is similar to that above described.

It will be seen that this invention provides a new and improved variable torque, variable speed hydraulic clutch which is simplified in construction and is made more positive and accurate in operation, as well as providing for minimum of power loss in operation. It occupies the smallest possible space for any installation and the two-part brackets as at 38 and 60 provide for evenly distributed torque to the gearing, which in turn actuates the rotary valves.

Having thus described my invention and the advantages thereof, I do not wish to be limited to the details herein disclosed, otherwise than as set forth in the claims, but what I claim is:

1. A variable hydraulic clutch comprising a housing, a driven shaft and a drive shaft each having an end journalled in the housing, a block rotatable on the said drive shaft end, means forming cylinders therein, pistons in the cylinders, means forming a fluid passage connecting the cylinders, means on the drive shaft to reciprocate the pistons in unison and to move fluid in the passage back and forth, a rotary valve in the fluid passage between the pistons, means to turn the valve to gradually open and close the valve to open and close the passage, said valve comprising a member located across the fluid passage and having a transverse bore therein which aligned with the passage opens the same and misaligned closes the passages, the valve member and fluid passage being of a section substantially the same as that of each cylinder.

2. A variable hydraulic clutch comprising a housing, a driven shaft and a drive shaft each having an end in the housing, a block rotatable on the said drive shaft end, means forming cylinders therein, pistons in the cylinders, means forming a fluid passage connecting the cylinders, the passage having a section substantially equal to that of each cylinder, means on the drive shaft to reciprocate the pistons in unison and to move fluid in the passage back and forth, a rotary valve in the fluid passage between the pistons, means to turn the valve to gradually open and close the valve to open and close the passage, said valve comprising a member located across the fluid passage and having a transverse bore therein which aligned with the passage opens the same and misaligned closes the passage, gearing connected to the valve member to turn the latter, means under manual control to actuate the gearing.

3. The clutch of claim 1 wherein the last-named means comprises a rectilinearly movable rack engaged with the gearing, and means to move the rack.

References Cited in the file of this patent

UNITED STATES PATENTS

| | | |
|---|---|---|
| 1,450,441 | Johnson | Apr. 3, 1923 |
| 1,542,215 | Carter | June 16, 1925 |
| 1,948,656 | Ewer | Feb. 27, 1934 |
| 2,086,889 | Anderson | July 13, 1937 |
| 2,749,765 | Moores | June 12, 1956 |

FOREIGN PATENTS

| | | |
|---|---|---|
| 228,457 | Germany | Nov. 10, 1910 |